G. M. CARKEY.
WEEDER.
APPLICATION FILED NOV. 18, 1919.
1,398,500.
Patented Nov. 29, 1921.
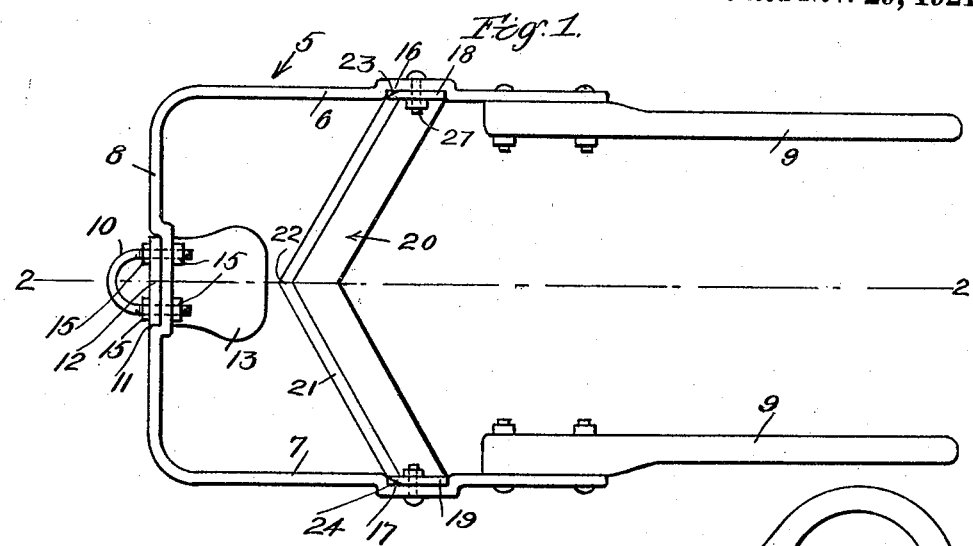
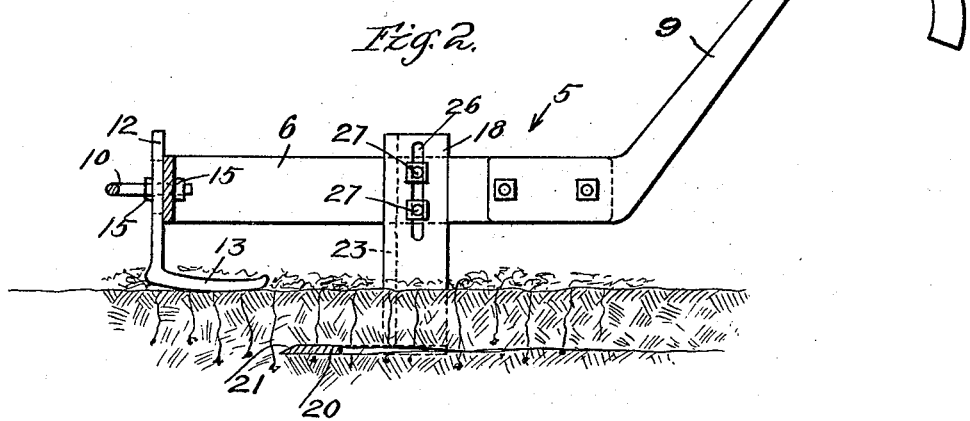
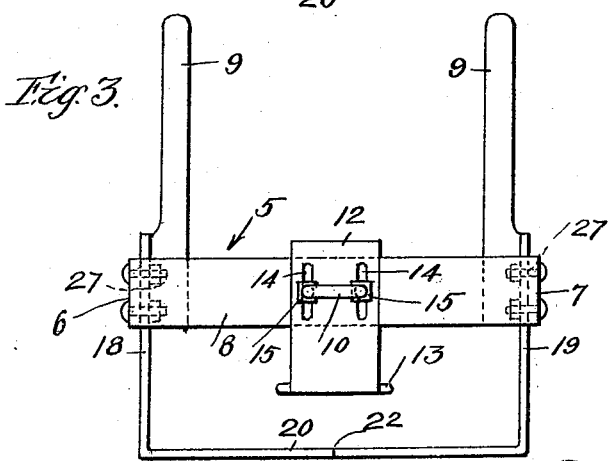
INVENTOR
George M. Carkey
Edmund A. Strause
ATTORNEY

UNITED STATES PATENT OFFICE.

GEORGE M. CARKEY, OF BLOOMINGTON, CALIFORNIA.

WEEDER.

1,398,500.  Specification of Letters Patent.  Patented Nov. 29, 1921.

Application filed November 18, 1919. Serial No. 338,850.

*To all whom it may concern:*

Be it known that I, GEORGE M. CARKEY, a citizen of the United States, residing at Bloomington, in the county of San Bernardino and State of California, have invented new and useful Improvements in Weeders, of which the following is a specification.

My invention relates to weeders, and is particularly adapted for the cutting of the stalks of weeds, corn, Bermuda grass, and other objectionable and tenacious vegetation, at a suitable distance below the ground, and near the roots, whereby the foliage may be readily removed by means of a rake, or otherwise from the surface of the ground, in order that the ground may be cultivated with comparative ease.

It is another object of my invention to provide an implement which may be readily adjusted to cut the stalks of objectionable vegetation at any desired distance below the ground.

A further object of my invention is to provide an implement, whereby the cut foilage of the weeds, etc., will not be dragged over the surface of the ground, but will lie upon the ground in approximately the same place they were in before they were cut.

Other objects will appear in the following description, will be pointed out in the claim, and will be embodied in the accompanying drawings, in which:

Figure 1 represents my weed cutting implement in plan view.

Fig. 2 is a transverse section of the same, taken on the line 2—2 of Fig. 1, showing the cutting blade projecting in and under the surface of the ground, as it would appear when in use.

Fig. 3 is a front view of the implement.

In carrying out my invention, I employ a suitable frame 5, preferably formed of strap metal which is so shaped as to form the side members 6 and 7 and the front member 8. To each of the ends of members 6 and 7 is secured a suitable handle 9, preferably of the plow or cultivator type, adapted to be grasped by the operator for guiding and steadying of the implement. The front member 8 is provided with the U bolt 10, which is adapted to receive the hook of the draft gear.

The member 8 is provided with an indent 11 adapted to receive the upwardly extending standard 12 of a shoe 13, said standard being vertically adjustable in the indent 11, and having provided for this purpose, the slots 14 through which each leg of the U bolt 10 passes. The standard 12 is held rigidly in adjusted position by means of the nuts 15, as clearly shown in Figs. 1 and 3.

The side members 6 and 7 of frame 5 are each provided with the oppositely disposed indents 16 and 17, adapted to receive the upturned bars 18 and 19, which support the stalk cutting blade 20. The stalk cutting blade 20 is preferably formed of hardened steel in the shape of a bar, the flat surfaces of said bar being adapted to move through the ground in parallel relation therewith, and underneath its surface at any desired distance, and in order that the stalks may be more readily severed, the forward edge of said cutting blade is beveled to a knife edge as at 21.

In order that the cutting blade 20 may have a shearing action when it encounters the stalks of the weeds, I prefer to make it of V shape, as shown in Fig. 1, the point 22, of said V, being forward with respect to the direction of the travel of the implement; and in order that the foliage weeds which would lie in the path of the upturned bars 18 and 19 may not become entangled therewith, I bevel the forward edges of the same to form knife edges 23 and 24. By this construction it will be seen that the foliage of the weeds on the surface of the ground will be cut by the knife edges on bars 18 and 19, and will not become entangled thereon or carried forward thereby.

The upturned bars 18 and 19 are each provided with a slot 26 to receive the bolts 27, which pass through apertures in the side members 6 and 7. By this construction it will be seen that the cutting bar 20 may be adjusted upwardly and downwardly on the frame 5.

In the operation of my implement it is obvious that the shoe 13, and the cutting bar 20, may be adjusted with respect to each other in order to limit the distance between said knife bar and the surface of the ground, and to facilitate the cutting of the various kinds of weeds or grass; and it is also obvious that a wheel or roller (not shown) may be substituted for the shoe 13 to perform the same function.

Although I have shown the cutting bar 20 of V-shape, in order that a shearing action may be attained, as well as to prevent it from being diverted from its natural path, it is obvious that said bar may be made straight or curved, without departing from the spirit of my invention.

What I claim is:

A weed cutting machine, comprising a substantially rectangular strap iron frame having handle bars secured to two oppositely disposed sides of said frame, a ground contact shoe adjustable in a vertical direction secured to the front end of said frame, and a flat horizontally disposed cutting blade of V shaped form having its point extending forwardly with respect to the direction of movement adapted to be projected under the surface of the ground and having an upwardly extending arm at each of its ends, said arms being secured to said frame and adjustable in a vertical direction.

In witness that I claim the foregoing I have hereunto subscribed my name this 7th day of November, 1919.

G. M. CARKEY.